US010940550B2

United States Patent
Breutzman

(10) Patent No.: US 10,940,550 B2
(45) Date of Patent: Mar. 9, 2021

(54) CUTTING TOOTH SYSTEM FOR A DISK-SAW FELLING HEAD

(71) Applicant: Deere & Company, Moline, IL (US)

(72) Inventor: Mark E Breutzman, Potosi, WI (US)

(73) Assignee: DEERE & COMPANY, Moline, IL (US)

(*) Notice: Subject to any disclaimer, the term of this patent is extended or adjusted under 35 U.S.C. 154(b) by 65 days.

(21) Appl. No.: 15/984,889

(22) Filed: May 21, 2018

(65) Prior Publication Data
US 2019/0351494 A1 Nov. 21, 2019

(51) Int. Cl.
B23D 61/06 (2006.01)
A01G 23/081 (2006.01)
B23D 61/02 (2006.01)

(52) U.S. Cl.
CPC .......... *B23D 61/06* (2013.01); *A01G 23/081* (2013.01); *B23D 61/025* (2013.01)

(58) Field of Classification Search
CPC ............... B27B 33/142; B27B 33/144; Y10T 83/9326–9343; A01G 23/081
USPC ....... 83/839–845, 834, 848, 851; 125/15, 22
See application file for complete search history.

(56) References Cited

U.S. PATENT DOCUMENTS

| | | | | |
|---|---|---|---|---|
| 31,073 A * | 1/1861 | Brown | ............... | B23D 61/04 83/853 |
| 103,045 A * | 5/1870 | Hiles | ............... | B23D 61/06 83/841 |
| 107,593 A * | 9/1870 | Brooke | ............... | B23D 61/06 83/841 |
| 306,967 A * | 10/1884 | Simonds | ............... | B23D 61/06 83/841 |
| 431,510 A * | 7/1890 | Douglas | ............... | B23D 61/04 83/855 |
| 542,630 A * | 7/1895 | Douglas | ............... | B23D 61/04 83/854 |
| 604,279 A * | 5/1898 | Walquist et al. | ...... | B23D 61/04 83/853 |
| 646,284 A * | 3/1900 | Hilton | ............... | B23D 61/023 407/47 |
| 1,033,996 A * | 7/1912 | Douglas | ............... | B23D 61/04 83/854 |
| 1,657,481 A * | 1/1928 | Perry | ............... | B23D 61/06 125/22 |

(Continued)

OTHER PUBLICATIONS

"King-Arthurs-Tools-45822-Lancelot22-Tooth,-5/8inch-Center-Hole"; [Retrieved Aug. 28, 2017];https://www.amazon.com/King-Arthurs-Tools-48222-Lancelot/dp/B0000224SJ.

(Continued)

*Primary Examiner* — Laura M Lee

(57) ABSTRACT

A cutting tooth system for a disk of a disk-saw felling head. The disk defines a receiving portion and an axis of rotation. The cutting tooth system comprises at least one cutting tooth. The cutting tooth comprises a first portion defining a first protrusion and a second protrusion. The first portion is configured to be received in the receiving portion for rotation with the disk. A second portion defines a chip removal path and a cutting edge adjacent the chip removal path. A first retaining device is configured to couple to the disk to secure the first protrusion in the receiving portion. A second retaining device is configured to couple to the disk to secure the second protrusion in the receiving portion.

17 Claims, 4 Drawing Sheets

(56) References Cited

U.S. PATENT DOCUMENTS

| | | | | |
|---|---|---|---|---|
| 1,988,898 | A | * 1/1935 | Hafner | B23D 61/025 83/841 |
| 2,725,906 | A | * 12/1955 | Markham | B23D 61/06 83/853 |
| 3,425,467 | A | * 2/1969 | Willis | B27G 13/005 144/218 |
| 3,885,488 | A | * 5/1975 | Evancic | B23D 61/06 83/835 |
| 4,084,470 | A | * 4/1978 | Reed | B23D 61/06 83/841 |
| 4,627,322 | A | 12/1986 | Hayhurst, Jr. | |
| 4,813,325 | A | 3/1989 | Gelman | |
| 4,881,438 | A | 11/1989 | Pinney | |

OTHER PUBLICATIONS

"Chainsaw TEETH Tooth Blade 7"/180mm"; [Retrieved Aug. 28, 2017]; https://www.ebay.co.uk/itm/Chainsaw-TEETH/Tooth-BLADE-7-180mm-Trimmer-BRUSH-CUTTER-25-4mm-ID-Weed-/162509807155.

* cited by examiner

220

At least one cutting tooth 115 is provided. The cutting tooth 115 comprises a first portion 120 defining a first protrusion 125 and a second protrusion 130. The first protrusion 125 may comprise a first curved portion 135 configured for receiving the first retaining device 140 that is cylindrically shaped. The second protrusion 130 may comprise a second curved portion 145 configured for receiving the second retaining device 150 that is cylindrically shaped. The first portion 120 is configured to be received in the receiving portion 110 for rotation with the disk 95. A second portion 160 defines a chip removal path 165 and a cutting edge 170 adjacent the chip removal path 165.

225

A first retaining device 140 is provided that is coupled to the disk 95 to secure the first protrusion 125 in the receiving portion 110.

230

A second retaining device 150 is provided that is coupled to the disk 95 to secure the second protrusion 130 in the receiving portion 110. The second retaining device 150 may comprise a notch 155 positioned to receive the second protrusion 130.
The second portion 160 may be curved and form a concave surface 175 that defines the chip removal path 165. The at least one cutting tooth 115 may be a first cutting tooth 180 positioned with a first chip removal path 185 positioned in a downward axial direction, further comprising a second cutting tooth 195 positioned with a second chip removal path 200 positioned in an upward axial direction.

FIG. 4

CUTTING TOOTH SYSTEM FOR A DISK-SAW FELLING HEAD

FIELD OF DISCLOSURE

The present disclosure generally relates to disk-saw felling heads, and more particularly to a system and method for mounting at least one cutting tooth to a disk-saw felling head.

BACKGROUND OF THE DISCLOSURE

In order to mount a cutting tooth to a disk-saw felling head, the cutting tooth commonly has a blind bore that is threaded and receives a bolt to secure the cutting tooth to a disk of the disk-saw felling head.

SUMMARY OF THE DISCLOSURE

In one embodiment, a cutting tooth system for a disk-saw felling head is disclosed. A disk defines a receiving portion and an axis of rotation. The cutting tooth system comprising at least one cutting tooth. The cutting tooth comprises a first portion that defines a first protrusion and a second protrusion. The first portion is configured to be received in the receiving portion for rotation with the disk. A second portion defines a chip removal path and a cutting edge adjacent the chip removal path. A first retaining device is configured to couple to the disk to secure the first protrusion in the receiving portion. A second retaining device is configured to couple to the disk to secure the second protrusion in the receiving portion.

In another embodiment, a disk-saw felling head is disclosed. The disk-saw felling head comprises a disk that defines a receiving portion and an axis of rotation. A cutting tooth system comprises at least one cutting tooth. The cutting tooth comprises a first portion that defines a first protrusion and a second protrusion. The first portion is configured to be received in the receiving portion for rotation with the disk. A second portion defines a chip removal path and a cutting edge adjacent the chip removal path. A first retaining device is coupled to the disk to secure the first protrusion in the receiving portion. A second retaining device is coupled to the disk to secure the second protrusion in the receiving portion.

In yet another embodiment, a method for coupling a cutting tooth system to a disk of a disk-saw felling head is disclosed. The method comprises providing at least one cutting tooth comprising a first portion and a second portion. The first portion defines a first protrusion and a second protrusion. The first portion is configured to be received in the receiving portion for rotation with the disk. The second portion defines a chip removal path and a cutting edge adjacent the chip removal path. The method further comprises providing a first retaining device coupled to the disk to secure the first protrusion in the receiving portion and providing a second retaining device coupled to the disk to secure the second protrusion in the receiving portion.

Other features and aspects will become apparent by consideration of the detailed description and accompanying drawings.

BRIEF DESCRIPTION OF THE DRAWINGS

FIG. 4 is a schematic of an illustrative method for coupling a cutting tooth system to a disk of a disk-saw felling head of a work vehicle.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figure 1:
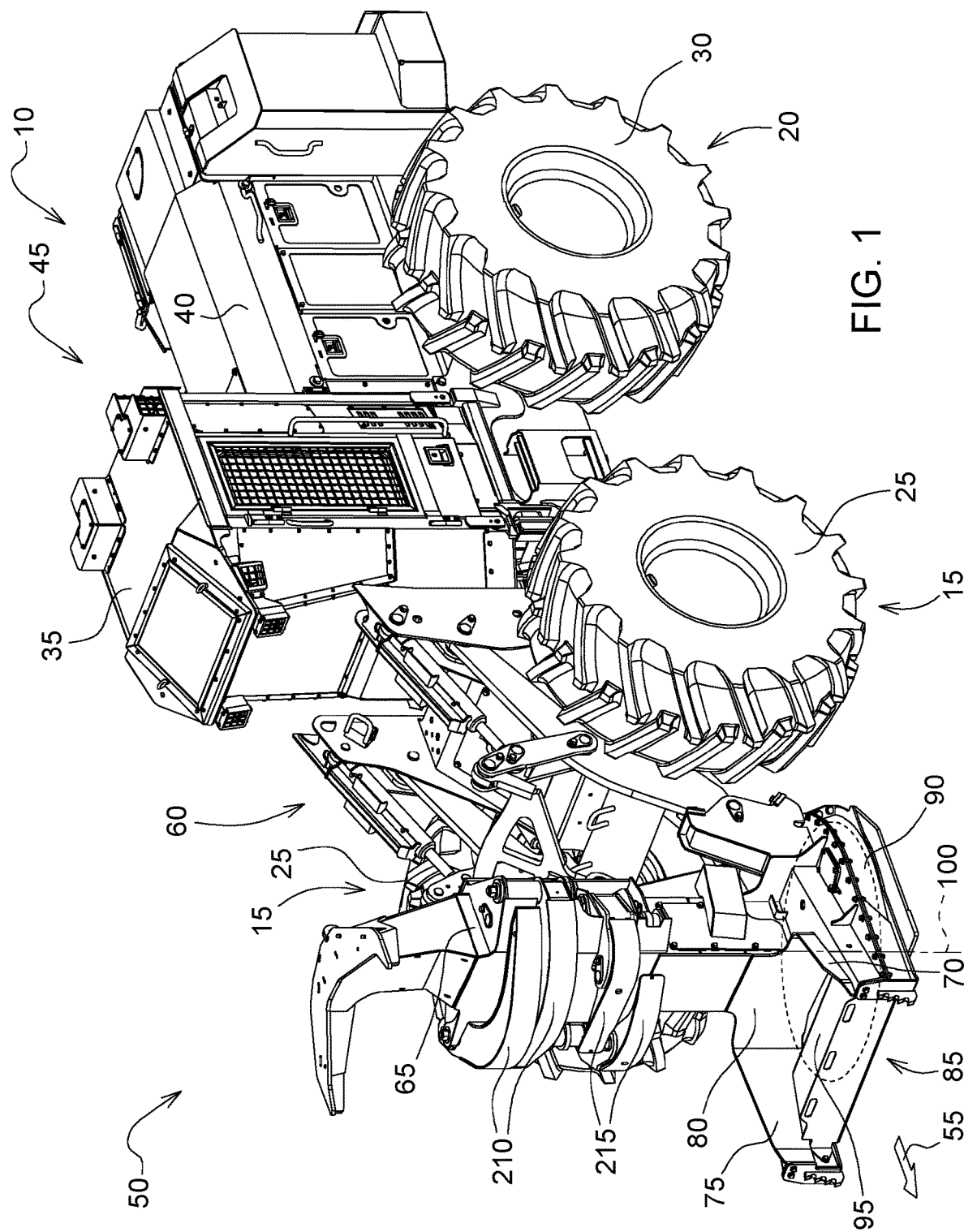
FIG. 1 is a perspective view of a work vehicle according to one embodiment with a cutting tooth system for a disk of a disk-saw cutting head.

FIG. 1 illustrates a work vehicle 10 supported by a first set of ground-engagin devices 15 and a second set of ground-engaging devices 20. The first and second sets of ground-engaging devices 15, 20 are configured to move the work vehicle 10 along a surface. The illustrated first set of ground-engaging devices 15 are a first pair of wheels 25. The illustrated second set of ground-engaging devices 20 are a second pair of wheels 30. Alternatively, the first and second sets of ground-engaging devices 15, 20 may be tracks (not shown).

The work vehicle 10 includes an operator's station 35. The work vehicle 10 may be powered by an engine 40 that is coupled to a transmission (not shown) for transferring power to the first set of ground-engaging devices 15 and the second set of ground-engaging devices 25. The engine 40 may be a diesel engine. Alternatively, the first and second sets of ground-engaging devices 15, 20 may be powered by electric motors (not shown).

The illustrated work vehicle 10 is a wheeled feller buncher 45. Alternatively, the work vehicle 10 may be a tracked feller buncher (not shown). The work vehicle 10 may include a disk-saw felling head 50 coupled to the work vehicle 10 forwardly 55 of the operator's station 35 for felling trees.

A linkage assembly 60 allows the disk-saw felling head 50 to be raised, lowered, and tilted to position the disk-saw felling head 50 at a desired position relative to a tree to be felled. The disk-saw felling head 50 includes a support frame 65 supported by the linkage assembly 60. The disk-saw felling head includes saw housing extensions 70, 75 and an accumulation pocket 80 into which felled trees are directed for short-term storage while additional trees are felled. The saw housing extensions 70, 75 generally assist in aligning the disk-saw felling head 50 with a tree to be felled.

The support frame 65 supports a tree cutting tool assembly 85 that is used to cut a tree trunk from its roots. According to the exemplary embodiment of the present disclosure, the tree cutting tool assembly 85 includes a saw housing 90 and a circular saw blade, or disk, 95 that rotates about an axis of rotation 100.

Figure 2:
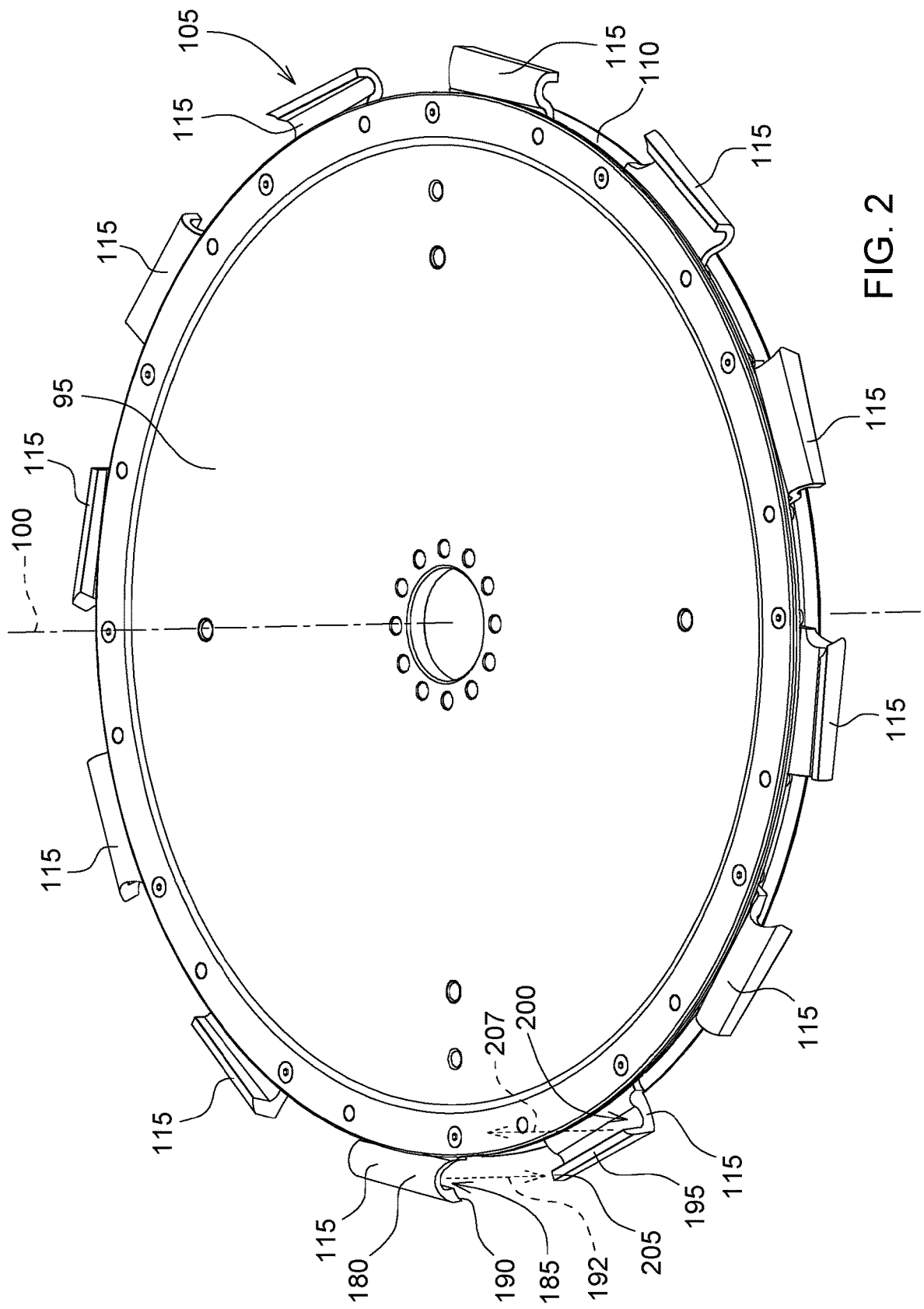
FIG. 2 is a perspective view of the disk of the work vehicle of FIG. 1.

With reference to FIG. 2, a cutting tooth system 105 is coupled to the disk 95 of the disk-saw felling head 50 for cutting trees. The disk 95 defines a receiving portion 110 for receiving the cutting tooth system 105. The receiving portion 110 may be a groove or a slot formed or machined into the disk 95.

Figure 3:
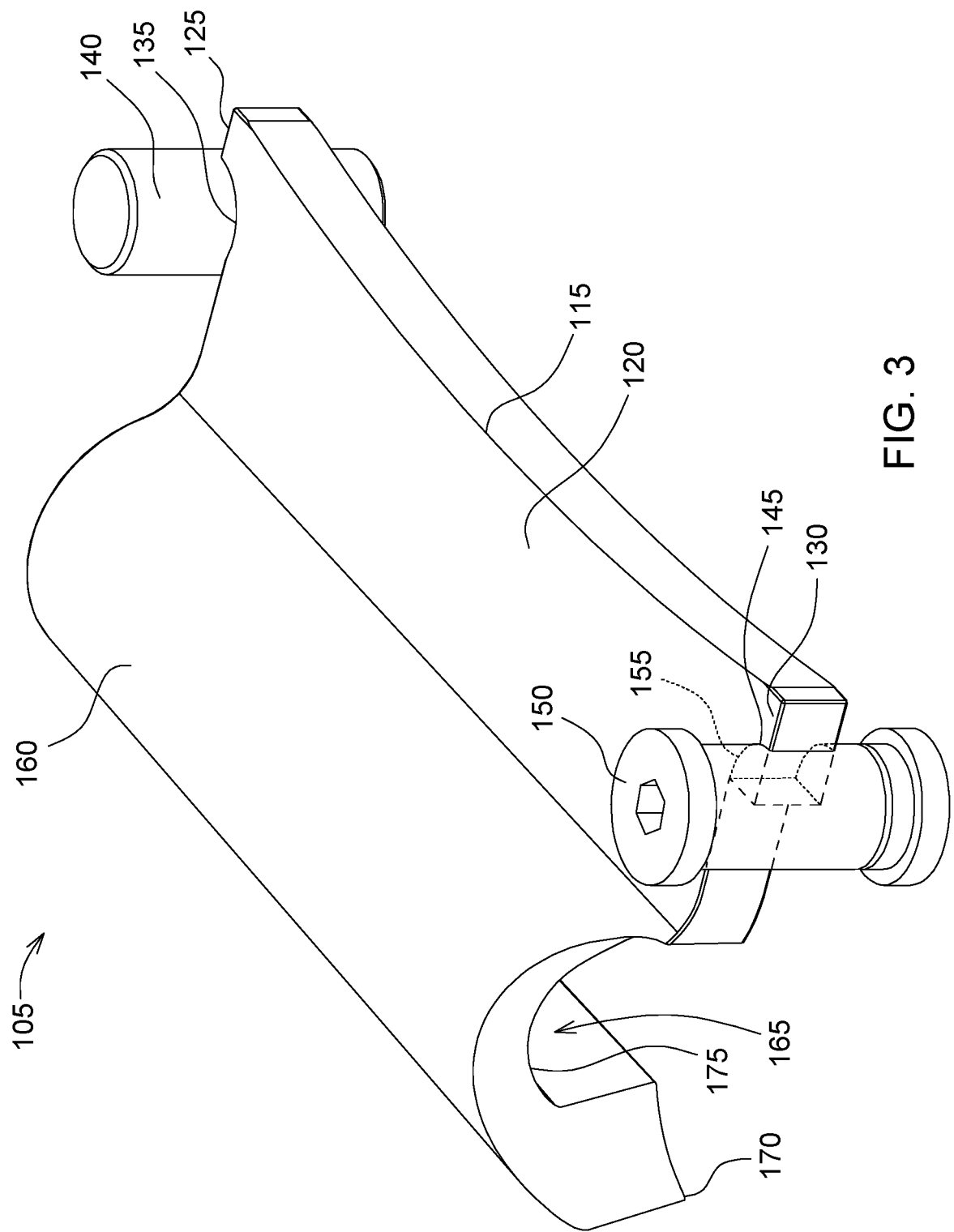
FIG. 3 is a perspective view of the cutting tooth system of FIG. 1.

Referring to FIG. 3, the cutting tooth system 105 comprises at least one cutting tooth 115 comprising a first portion 120 defining a first protrusion 125 and a second protrusion 130. The first portion 120 is configured to be received in the receiving portion 110 for rotation with the disk 95 (FIG. 2).

With continued reference to FIG. 3, the first protrusion 125 may comprise a first curved portion 135 configured for receiving a first retaining device 140 that is cylindrically shaped. The first curved portion 135 and the first retaining device 140 may be other shapes. The first retaining device 140 may be a fixed pin or other fastener. The first retaining device 140 is configured to couple to the disk 95 to secure the first protrusion 125 in the receiving portion 110.

The second protrusion 130 may comprise a second curved portion 145 configured for receiving a second retaining device 150 that is cylindrically shaped. The second curved portion 145 and the second retaining device 150 may be other shapes. The second retaining device 150 may comprise a notch 155 positioned to receive the second protrusion 130. The second retaining device 150 may be a fixed pin or a threaded fastener and the notch 155 may be used to secure the cutting tooth 115 in the receiving portion by rotating the second retaining device 150. The second retaining device 150 is configured to couple to the disk 95 to secure the second protrusion 130 in the receiving portion 110.

The cutting tooth 115 comprises a second portion 160 defining a chip removal path 165 and a cutting edge 170 adjacent the chip removal path 165. The second portion 160 may be curved and form a concave surface 175 that defines the chip removal path 165.

Referring to FIG. 2, the cutting tooth 115 may be a first cutting tooth 180 that may be positioned with a first chip removal path 185 and a first cutting edge 190 positioned in a downward axial direction 192. A second cutting tooth 195 may be positioned with a second chip removal path 200 and a second cutting edge 205 positioned in an upward axial direction 207. Thus, the first cutting tooth 180 and the second cutting tooth 195 are adjacent and the first chip removal path 185 and the first cutting edge 190 are positioned in opposite directions of the second chip removal path 200 and the second cutting edge 205 forming an alternating pattern. At least one additional cutting tooth 115 may be positioned next to the first and second cutting tooth 180, 195 and continue with the alternating pattern.

Alternatively, the first and second cutting tooth 180, 195 may be positioned with the first chip removal path 185 and the first cutting edge 190 in the same directions as the second chip removal path 200 and the second cutting edge 205. At least one additional cutting tooth 115 may be positioned next to the first and second cutting tooth 180, 195 with the same orientation of the chip removal path 165 and cutting edge 170. Alternatively, the cutting tooth 115 may be positioned in a pattern that alternates by two or three cutting teeth 115 having the chip removal path 165 and the cutting edge 170 in the same orientation. Other cutting tooth 115 alternating patterns are also contemplated by this disclosure.

With reference to FIG. 1, the support frame 65 also pivotably supports at least one gathering arm 210 and at least one accumulation arm 215 that gather and hold felled trees in the accumulation pocket 80. The gathering arm 210 is positioned below and is designed to guide cut trees into the accumulation pocket 80, while the accumulation arm 215 is designed to hold the accumulated trees in the accumulation pocket 80.

A method for coupling a cutting tooth system 105 to a disk 95 of a disk-saw felling head 50 is illustrated in FIG. 4. The disk 95 defines a receiving portion 110 and an axis of rotation 100. In Step 220, at least one cutting tooth 115 is provided. The cutting tooth 115 comprises a first portion 120 defining a first protrusion 125 and a second protrusion 130. The first protrusion 125 may comprise a first curved portion 135 configured for receiving the first retaining device 140 that is cylindrically shaped. The second protrusion 130 may comprise a second curved portion 145 configured for receiving the second retaining device 150 that is cylindrically shaped. The first portion 120 is configured to be received in the receiving portion 110 for rotation with the disk 95. A second portion 160 defines a chip removal path 165 and a cutting edge 170 adjacent the chip removal path 165.

In Step 225, a first retaining device 140 is provided that is coupled to the disk 95 to secure the first protrusion 125 in the receiving portion 110. In Step 230, a second retaining device 150 is provided that is coupled to the disk 95 to secure the second protrusion 130 in the receiving portion 110. The second retaining device 150 may comprise a notch 155 positioned to receive the second protrusion 130.

The second portion 160 may be curved and form a concave surface 175 that defines the chip removal path 165. The at least one cutting tooth 115 may be a first cutting tooth 180 positioned with a first chip removal path 185 positioned in a downward axial direction, further comprising a second cutting tooth 195 positioned with a second chip removal path 200 positioned in an upward axial direction.

Various features are set forth in the following claims.

What is claimed is:

1. A cutting tooth system for a disk of a disk-saw felling head, the disk defining a receiving portion and an axis of rotation, the cutting tooth system comprising:
   at least one cutting tooth comprising:
   a first portion defining a first protrusion protruding in one direction and a second protrusion protruding in another direction, the first portion configured to be received in the receiving portion for rotation with the disk; and
   a second portion defining a chip removal path and a cutting edge adjacent the chip removal path;
   a first retaining device configured to couple to the disk to engage an outer edge of the first protrusion positioned outward relative to the axis of rotation and prevent the first protrusion from moving radially outward from the receiving portion; and
   a second retaining device configured to couple to the disk to engage an outer edge of the second protrusion positioned outward relative to the axis of rotation and prevent the second protrusion from moving radially outward from the receiving portion;
   wherein with a cooperation between the first protrusion engaging the outer edge of the first protrusion and the outer edge of the second protrusion engaged by the second retaining device, the at least one cutting tooth is secured on the disk;
   wherein the second portion is curved and forms a concave surface that defines the chip removal path.

2. The cutting tooth system of claim 1, wherein the first protrusion comprises a first curved portion configured for receiving the first retaining device that is cylindrically shaped, and with the first protrusion protruding in the one direction, the first curved portion extending to form the outer edge of the first protrusion.

3. The cutting tooth system of claim 1, wherein the second protrusion comprises a second curved portion configured for receiving the second retaining device that is cylindrically shaped.

4. The cutting tooth system of claim 1, wherein the second retaining device comprises a notch positioned to receive the second protrusion with an upper portion of the notch engaging with a top surface of the second protrusion and with a lower portion of the notch engaging the bottom surface of the second protrusion so as to prevent the second protrusion from moving in an axial direction.

5. The cutting tooth system of claim 1, wherein the at least one cutting tooth is a first cutting tooth positioned with a first chip removal path positioned in a downward axial direction, further comprising a second cutting tooth positioned with a second chip removal path positioned in an upward axial direction.

6. The cutting tooth system of claim 1, wherein the first retaining device is configured to engage a first side edge of the first portion and the second retaining device is configured to engage a second side edge of the first portion opposite the first side edge so as to circumferentially limit the first portion between the first retaining device and the second retaining device.

7. A disk-saw felling head comprising:
   a disk defining a receiving portion and an axis of rotation;
   a cutting tooth system comprising:
      at least one cutting tooth comprising:
      a first portion defining a first protrusion protruding in one direction and a second protrusion protruding in another direction, the first portion configured to be received in the receiving portion for rotation with the disk; and
      a second portion defining a chip removal path and a cutting edge adjacent the chip removal path;
      a first retaining device coupled to the disk to engage an outer edge of the first protrusion positioned outward relative to the axis of rotation and prevent the first protrusion from moving radially outward from the receiving portion; and
      a second retaining device coupled to the disk to engage an outer edge of the second protrusion positioned outward relative to the axis of rotation and prevent the second protrusion from moving radially outward from the receiving portion;
      wherein with a cooperation between the first protrusion engaging the outer edge of the first protrusion and the outer edge of the second protrusion engaged by the second retaining device, the at least one cutting tooth is secured on the disk;
      wherein the second portion is curved and forms a concave surface that defines the chip removal path.

8. The disk saw felling head of claim 7, wherein the first protrusion comprises a first curved portion configured for receiving the first retaining device that is cylindrically shaped, and with the first protrusion protruding in the one direction, the first curved portion extending to form the outer edge of the first protrusion.

9. The disk saw felling head of claim 7, wherein the second protrusion comprises a second curved portion configured for receiving the second retaining device that is cylindrically shaped.

10. The disk saw felling head of claim 7, wherein the second retaining device comprises a notch positioned to receive the second protrusion with an upper portion of the notch engaging with a top surface of the second protrusion and with a lower portion of the notch engaging the bottom surface of the second protrusion so as to prevent the second protrusion from moving in an axial direction.

11. The disk saw felling head of claim 7, wherein the at least one cutting tooth is a first cutting tooth positioned with a first chip removal path positioned in a downward axial direction, further comprising a second cutting tooth positioned with a second chip removal path positioned in an upward axial direction.

12. The disk saw felling head of claim 7, wherein the first retaining device is configured to engage a first side edge of the first portion and the second retaining device is configured to engage a second side edge of the first portion opposite the first side edge so as to circumferentially limit the first portion between the first retaining device and the second retaining device.

13. A method for coupling a cutting tooth system to a disk of a disk-saw felling head, the disk defining a receiving portion and an axis of rotation, the method comprising:
   providing at least one cutting tooth comprising a first portion defining a first protrusion protruding in one direction and a second protrusion protruding in another direction, the first portion configured to be received in the receiving portion for rotation with the disk, and a second portion defining a chip removal path and a cutting edge adjacent the chip removal path;
   providing a first retaining device coupled to the disk to engage an outer edge of the first protrusion positioned outward relative to the axis of rotation and prevent the first protrusion from moving radially outward from the receiving portion; and
   providing a second retaining device coupled to the disk to engage an outer edge of the second protrusion positioned outward relative to the axis of rotation and prevent the second protrusion from moving radially outward from the receiving portion;
   wherein with a cooperation between the first protrusion engaging the outer edge of the first protrusion and the outer edge of the second protrusion engaged by the second retaining device, the at least one cutting tooth is secured on the disk;
   wherein the second portion is curved and forms a concave surface that defines the chip removal path.

14. The method of claim 13, wherein the first protrusion comprises a first curved portion configured for receiving the first retaining device that is cylindrically shaped, and with the first protrusion protruding in the one direction, the first curved portion extending to form the outer edge of the first protrusion.

15. The method of claim 13, wherein the second protrusion comprises a second curved portion configured for receiving the second retaining device that is cylindrically shaped.

16. The method of claim 13, wherein the second retaining device comprises a notch positioned to receive the second protrusion with an upper portion of the notch engaging with a top surface of the second protrusion and with a lower portion of the notch engaging the bottom surface of the second protrusion so as to prevent the second protrusion from moving in an axial direction.

17. The method of claim 13, wherein the first retaining device is configured to engage a first side edge of the first portion and the second retaining device is configured to engage a second side edge of the first portion opposite the first side edge so as to circumferentially limit the first portion between the first retaining device and the second retaining device.

* * * * *